United States Patent
Zhao et al.

(10) Patent No.: US 12,470,128 B2
(45) Date of Patent: Nov. 11, 2025

(54) POWER CONVERTOR CONTROL METHOD, CONTROL APPARATUS, AND COMPUTER STORAGE MEDIUM

(71) Applicant: HUAWEI DIGITAL POWER TECHNOLOGIES CO., LTD., Shenzhen (CN)

(72) Inventors: Mingquan Zhao, Shanghai (CN); Kai Xin, Shanghai (CN); Peng Dong, Shanghai (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 100 days.

(21) Appl. No.: 18/589,857

(22) Filed: Feb. 28, 2024

(65) Prior Publication Data
US 2024/0204654 A1  Jun. 20, 2024

Related U.S. Application Data

(63) Continuation of application No. PCT/CN2022/113376, filed on Aug. 18, 2022.

(30) Foreign Application Priority Data

Aug. 31, 2021  (CN) .......................... 202111010964.0

(51) Int. Cl.
*H02M 1/32* (2007.01)
*H02J 3/16* (2006.01)
(Continued)

(52) U.S. Cl.
CPC .............. *H02M 1/322* (2021.05); *H02J 3/16* (2013.01); *H02M 1/0009* (2021.05);
(Continued)

(58) Field of Classification Search
CPC ........ H02M 1/32; H02M 1/0009; H02M 1/44; H02M 7/44; H02J 3/16
See application file for complete search history.

(56) References Cited

U.S. PATENT DOCUMENTS

| | | | |
|---|---|---|---|
| 11,108,235 B1* | 8/2021 | Awal .......................... | H02J 3/24 |
| 2005/0029982 A1* | 2/2005 | Stancu ................ | H02P 21/0089 |
| | | | 318/801 |

(Continued)

FOREIGN PATENT DOCUMENTS

| CN | 110350580 A | 10/2019 |
|---|---|---|
| CN | 113890083 A | 1/2022 |

OTHER PUBLICATIONS

Paolonea et al., "Fundamentals of power systems modelling in the presence of converter interfaced generation," Electric Power Systems Research, Jun. 2020, 33 pages.

(Continued)

*Primary Examiner* — Rexford N Barnie
*Assistant Examiner* — Esayas G Yeshaw
(74) *Attorney, Agent, or Firm* — Fish & Richardson P.C.

(57) ABSTRACT

A power converter control method includes: determining a phase angle difference between a phase angle of a voltage output by the power converter and a phase angle of a power grid voltage; and if the phase angle difference is greater than or equal to a first angle threshold, setting a d-axis current reference value and a q-axis current reference value that are used to determine a modulation voltage of the power converter to preset fixed values; calculating a first modulation voltage of the power converter based on the d-axis current reference value, the q-axis current reference value, and a power grid current; calculating a compensation voltage of the power converter based on a preset virtual resistance parameter and the power grid current; and using a sum of the (Continued)

first modulation voltage and the compensation voltage as a total modulation voltage.

19 Claims, 8 Drawing Sheets

(51) Int. Cl.
*H02M 1/00* (2006.01)
*H02M 1/44* (2007.01)
*H02M 7/44* (2006.01)

(52) U.S. Cl.
CPC ........... *H02M 1/0043* (2021.05); *H02M 1/44* (2013.01); *H02M 7/44* (2013.01)

(56) References Cited

U.S. PATENT DOCUMENTS

2021/0384855 A1* 12/2021 Chen ................. H02M 7/53875
2022/0316443 A1* 10/2022 Zhang ....................... F03D 9/25
2024/0380208 A1* 11/2024 Zhang .................. H02M 7/797

OTHER PUBLICATIONS

International Search Report and Written Opinion in International Appln. No. PCT/CN2022/113376, mailed on Nov. 17, 2022, 22 pages (with English translation).
Extended European Search Report in European Appln. No. 22863167.7, mailed on Oct. 31, 2024, 7 pages.

\* cited by examiner

POWER CONVERTOR CONTROL METHOD, CONTROL APPARATUS, AND COMPUTER STORAGE MEDIUM

CROSS-REFERENCE TO RELATED APPLICATIONS

This application is a continuation of International Application No. PCT/CN2022/113376, filed on Aug. 18, 2022, which claims priority to Chinese Patent Application No. 202111010964.0, filed on Aug. 31, 2021. The disclosures of the aforementioned applications are hereby incorporated by reference in their entireties.

TECHNICAL FIELD

This application relates to the field of power converter control technologies, and in particular, to a power converter control method, a control apparatus, and a computer storage medium.

BACKGROUND

A power converter usually outputs power to a power grid in a power system. Electric energy output by the power converter is transmitted to the power grid through a filter circuit. A voltage or current between the filter circuit and the power grid is usually referred to as a generator terminal voltage or a generator terminal current. A voltage or current output by the power converter to the filter circuit is an output voltage or an output current of the power converter. The power converter is usually controlled through vector control. A distance between the power grid and the power converter is large, and it takes a long time to obtain voltage information of the power grid. Therefore, in a vector control process, the generator terminal voltage or the generator terminal current can be used as a power grid voltage or a power grid current.

During vector control, a phase angle θ of the power grid voltage is determined by using a phase-locked loop technology. This process is also called phase locking. As shown in FIG. 1(a), a d-axis component id and a q-axis component iq of the power grid current may be determined based on a three-phase current i of the power grid and the phase angle θ of the power grid and a conversion relationship between an ABC coordinate system and a dq coordinate system. When a phase of the power grid is locked, in other words, the phase angle of the power grid voltage determined by a phase-locked loop is equal to a phase angle of an actual power grid voltage, an origin of the ABC coordinate system is the same as that of the dq coordinate system, and an included angle between a positive direction of a d-axis in the dq coordinate system and a positive direction of an A-axis in the ABC coordinate system is the phase angle θ of the power grid.

As shown in FIG. 1(b), when the phase angle of the power grid voltage is θ1, a d-axis component of the current i in the ABC coordinate system is id1 in the dq coordinate system, and a q-axis component of the current i is iq1 in the dq coordinate system. A current adjustment module can use the d-axis component id of the current i, the q-axis component iq of the current i, an active current reference idr and a reactive current reference iqr, to determine a two-phase modulation voltage edq. A three-phase modulation voltage eabc in the ABC coordinate system may be determined based on the conversion relationship between the ABC coordinate system and the dq coordinate system. A pulse width modulation module can generate a control signal of the power converter based on the three-phase modulation voltage eabc. Driven by the control signal generated by the pulse width modulation module, a current output by the power converter to the power grid can be equal to or close to the active current reference idr and the reactive current reference iqr. In addition, a phase angle of the voltage output by the power converter is the same as the phase angle of the power grid.

When a phase jump does not occur in the power grid, as shown in FIG. 1(b), a vector direction of a power grid voltage u coincides with the positive direction of the d-axis in the dq coordinate system. When a phase jump occurs in the power grid, as shown in FIG. 1(c), the phase-locked loop fails to lock the phase angle of the power grid voltage, and the phase needs to be re-locked. In this case, the phase angle output by the power grid is different from the actual phase angle of the power grid voltage to a specific extent, which causes inconsistency between an actual vector direction of the power grid voltage u and the positive direction of the d-axis in the dq coordinate system.

In a re-locking process of the phase-locked loop, a d-axis component id1 and a q-axis component iq1 of the power grid current i that are determined based on a phase angle θ1 output by using the phase-locked loop are greatly different from a d-axis component id2 and a q-axis component iq2 of the power grid current i that are determined based on an actual phase angle θ2. When a severe phase jump occurs in the power grid, a phase difference Δθ between the actual phase angle θ2 and the phase angle θ1 provided by the phase-locked control loop is large. Symbols of the d-axis component id1 and the q-axis component iq1 of the power grid current i that are determined based on the phase angle θ1 may be opposite to symbols of the d-axis component id2 and the q-axis component iq2 of the power grid current i that are determined based on the actual phase angle θ2. The power converter may absorb power from the power grid, and the power on the power grid backfeeds to a direct current capacitor in the power converter. As a result, overvoltage occurs in the direct current capacitor, which affects the power converter and the power grid. Therefore, in a re-locking process of the phase-locked loop due to occurrence of a phase jump in the power grid, a method for protecting the power converter is urgently needed, to reduce impact that the power in the power grid imposes on the power converter.

SUMMARY

This application provides a power converter control method, a control apparatus, and a computer-readable storage medium, to protect a power converter when a large phase jump occurs in a power grid voltage. This can reduce a power backfeed degree, and reduce impact on the power grid and the power converter.

According to a first aspect, this application provides a power converter control method, applied to a power converter that provides power for a power grid. The power converter is connected to a filter circuit. The filter circuit is connected to the power grid. The method may be executed by a control apparatus. The method may include: determining a phase angle difference between a phase angle of a voltage output by the power converter and a phase angle of a power grid voltage, where the power grid voltage is a voltage between the filter circuit and the power grid, and the voltage output by the power converter is a voltage between the filter circuit and the power converter; and if the phase angle difference is greater than or equal to a first angle threshold, where the first angle threshold indicates a minimum value of the phase angle difference occurring when a phase jump occurs in the power grid, performing the following process: setting a d-axis current reference value and a q-axis current reference value that are used to determine a modulation voltage of the power converter to preset fixed values; calculating a first modulation voltage of the power converter based on the d-axis current reference value, the q-axis current reference value, and a power grid current, where the first modulation voltage is used to determine a total modulation voltage of the power converter, the total modulation voltage is used to generate a control signal of the power converter, and the control signal is used to drive the power converter to output the total modulation voltage; calculating a compensation voltage of the power converter based on a preset virtual resistance parameter and the power grid current, where the compensation voltage is used to compensate the first modulation voltage when the total modulation voltage of the power converter is determined, and the power grid current is a current between the filter circuit and the power grid; and using a sum of the first modulation voltage and the compensation voltage as the total modulation voltage, where a difference between the total modulation voltage and the power grid voltage is less than a difference between the voltage output by the power converter and the power grid voltage.

In this embodiment of this application, to ensure a normal operation of the power converter, in a process in which the control apparatus controls the power converter, the phase angle of the voltage output by the power converter is close to the phase angle of the power grid voltage, and a difference is small. When a phase jump occurs in the power grid, the control apparatus sets the d-axis current reference value and the q-axis current reference value that are used to determine the modulation voltage of the power converter to preset fixed values, and calculates the first modulation voltage based on the power grid current and the preset fixed values, to determine that the total modulation voltage of the power converter is in a controllable state. The compensation voltage is calculated based on the preset virtual resistance parameter and the power grid current. The first modulation voltage is compensated, to determine the total modulation voltage of the power converter. The total modulation voltage is also a voltage that the control apparatus drives the power converter to output. This design is equivalent to adding a virtual dynamic resistance to the power converter. Compared with a vector difference between the voltage output by the power converter and the power grid voltage, a vector difference between the total modulation voltage and the power grid voltage is smaller. This reduces fluctuation of active power and reactive power that are output by the power converter, reduces transient impact on the power grid and the power converter, protects the power converter, and reduces a power backfeed degree.

In a possible design, the calculating a first modulation voltage of the power converter based on the d-axis current reference value, the q-axis current reference value, and a power grid current includes: calculating a d-axis component id and a q-axis component iq of the power grid current in a two-phase coordinate system based on a conversion relationship between a three-phase coordinate system and the two-phase coordinate system and the power grid current, where an included angle between a positive direction of a d-axis in the two-phase coordinate system and a positive direction of an A-axis in the three-phase coordinate system is the phase angle of the power grid voltage; and calculating the first modulation voltage of the power converter in the two-phase coordinate system based on the d-axis current reference value, the q-axis current reference value, and the d-axis component and the q-axis component of the power grid current in the two-phase coordinate system.

In this embodiment of this application, when determining the first modulation voltage, the control apparatus may determine a d-axis component and a q-axis component of the power grid current in a phase-locked loop coordinate system. The phase-locked loop coordinate system is both a two-phase coordinate system and a dq coordinate system. An included angle between a positive direction of a d-axis in the phase-locked loop coordinate system and a positive direction of an A-axis in the three-phase coordinate system is the phase angle of the power grid voltage. The control apparatus may calculate the first modulation voltage based on the d-axis current reference value, the q-axis current reference value, and the d-axis component and the q-axis component of the power grid current in the two-phase coordinate system.

In a possible design, the calculating a compensation voltage of the power converter based on a preset virtual resistance parameter K and the power grid current includes: determining the compensation voltage based on a first voltage and a second voltage. The first voltage is a product of the d-axis component of the power grid current in the two-phase coordinate system and the virtual resistance parameter. The second voltage is a product of the q-axis component of the power grid current in the two-phase coordinate system and the virtual resistance parameter.

In this embodiment of this application, the control apparatus multiplies the d-axis component and the q-axis component of the power grid current in the two-phase coordinate system by the virtual resistance parameter separately, and determines an obtained sum of the first voltage and second voltage as the compensation voltage. It may be understood that the compensation voltage is a vector sum of the first voltage and the second voltage. The compensation voltage may be used to compensate the first modulation voltage, so that the total modulation voltage is close to the power grid voltage.

In a possible design, before the determining the compensation voltage, the method further includes: separately filtering the d-axis component and the q-axis component of the power grid current in the two-phase coordinate system, to eliminate noise signals of the power grid current in the d-axis component and the q-axis component in the two-phase coordinate system. In this embodiment of this application, before determining the compensation voltage, the control apparatus may filter a d-axis component and a q-axis component of the power grid voltage, to eliminate noise caused by sampling and digital control.

In a possible design, before the determining a phase angle difference between a phase angle of a voltage output by the power converter and a phase angle of a power grid voltage, the method further includes: calculating a q-axis component of the power grid voltage in the two-phase coordinate system based on the power grid voltage and the conversion relationship between the three-phase coordinate system and the two-phase coordinate system; inputting the q-axis component of the power grid voltage in the two-phase coordinate system into a proportional integral regulator, to generate a rotation frequency parameter; and inputting the rotation frequency parameter into an integrator, to generate the phase angle of the power grid voltage. In this embodiment of this application, the control apparatus determines the phase angle of the power grid voltage based on the power grid voltage, in other words, determines a phase of the power grid voltage based on the phase-locked loop control technology. The control apparatus may obtain the phase angle of the power grid voltage by using a phase-locked loop hardware circuit.

In a possible design, the determining a phase angle difference between a phase angle of a voltage output by the power converter and a phase angle of a power grid voltage includes: calculating the d-axis component and the q-axis component of the power grid voltage in the two-phase coordinate system based on the power grid voltage and the conversion relationship between the three-phase coordinate system and the two-phase coordinate system; and determining the phase angle difference according to a preset function, and the d-axis component (ud) and the q-axis component uq of the power grid voltage in the two-phase coordinate system. In this embodiment of this application, to quickly determine whether a phase jump occurs in the power grid, the control apparatus may determine the phase angle difference based on a d-axis component and a q-axis component of the power grid voltage in the phase-locked loop coordinate system.

In a possible design, before the calculating the d-axis component id and the q-axis component iq of the power grid current in the two-phase coordinate system, the method further includes: adjusting a parameter of the proportional integral regulator or a parameter of the integrator, to increase a speed of a generated phase angle of the power grid voltage to be equal to a speed of the phase angle of the power grid voltage. In this embodiment of this application, when a phase jump occurs in the power grid, the control apparatus may adjust a parameter of a proportional integral regulator or a parameter of an integrator in a phase-locked loop control loop, to increase a phase locking speed.

In a possible design, after the using a sum of the first modulation voltage and the compensation voltage as the total modulation voltage, the method further includes: if a phase angle difference between a most recently determined phase angle of the voltage output by the power converter and a phase angle of a voltage on a cable is less than a second angle threshold, where the second angle threshold is less than the first angle threshold, performing the following process: determining the d-axis current reference value based on a voltage at a direct current capacitor in the power converter, and determining the q-axis current reference value based on reactive power of the power converter; and calculating a second modulation voltage of the power converter based on the d-axis current reference value, the q-axis current reference value, and the power grid current. A control signal of the power converter generated based on the second modulation voltage is used to drive the power converter to output an active current that is the d-axis current reference value and to output a reactive current that is the q-axis current reference value.

In this embodiment of this application, after determining that a phase jump occurs in the power grid voltage, the control apparatus controls the power converter by using the determined total modulation voltage. If determining that the phase angle difference is less than the second angle threshold, the control apparatus may determine that the difference between the phase angle of the voltage output by the power converter and the phase angle of the power grid voltage is small. That is, if the phase angle of the power grid voltage is locked, the control apparatus may resume using the second modulation voltage to drive the power converter. If determining that the phase angle difference is greater than or equal to the second angle threshold, the control apparatus may determine that the difference between the phase angle of the voltage output by the power converter and the phase angle of the power grid voltage is small. That is, if the phase angle of the power grid voltage is not locked, the control apparatus continues to use the total modulation voltage to control the power converter.

According to a second aspect, this application provides a control apparatus, configured to control a power converter. The power converter is connected to a filter circuit. The filter circuit is connected to a power grid. The apparatus includes a voltage and current collection module and a processing module. The voltage and current collection module is configured to collect a power grid current and a power grid voltage. The power grid voltage is a voltage between the filter circuit and the power grid. The power grid current is a current between the filter circuit and the power grid. The processing module is configured to determine a phase angle difference between a phase angle of a voltage output by the power converter and a phase angle of the power grid voltage. If the phase angle difference is greater than or equal to a first angle threshold, where the angle threshold indicates a minimum value of the phase angle difference occurring when a phase jump occurs in the power grid, the processing module performs the following process: setting a d-axis current reference value and a q-axis current reference value that are used to determine a modulation voltage of the power converter to preset fixed values; calculating a first modulation voltage of the power converter based on the d-axis current reference value, the q-axis current reference value, and a power grid current, where the first modulation voltage is used to determine a total modulation voltage of the power converter, the total modulation voltage is used to generate a control signal of the power converter, and the control signal is used to drive the power converter to output the total modulation voltage; calculating a compensation voltage of the power converter based on a preset virtual resistance parameter and the power grid current, where the compensation voltage is used to compensate the first modulation voltage when the total modulation voltage of the power converter is determined; and using a sum of the first modulation voltage and the compensation voltage as the total modulation voltage, where a difference between the total modulation voltage and the power grid voltage is less than a difference between the voltage output by the power converter and the power grid voltage.

In a possible design, when calculating a first modulation voltage of the power converter based on the d-axis current reference value, the q-axis current reference value, and a power grid current, the processing module is configured to: calculate a d-axis component id and a q-axis component iq of the power grid current in a two-phase coordinate system based on a conversion relationship between a three-phase coordinate system and the two-phase coordinate system and the power grid current, where an included angle between a positive direction of a d-axis in the two-phase coordinate system and a positive direction of an A-axis in the three-phase coordinate system is the phase angle of the power grid voltage; and calculate the first modulation voltage of the power converter in the two-phase coordinate system based on the d-axis current reference value, the q-axis current reference value, and the d-axis component and the q-axis component of the power grid current in the two-phase coordinate system.

In a possible design, when calculating a compensation voltage of the power converter based on a preset virtual resistance parameter K and the power grid current, the processing module is configured to: determine the compensation voltage based on a first voltage and a second voltage. The first voltage is a product of the d-axis component of the power grid current in the two-phase coordinate system and the virtual resistance parameter. The second voltage is a product of the q-axis component of the power grid current in the two-phase coordinate system and the virtual resistance parameter.

In a possible design, the processing module is further configured to: before determining the compensation voltage, separately filter the d-axis component and the q-axis component of the power grid current in the two-phase coordinate system, to eliminate noise signals of the power grid current in the d-axis component and the q-axis component in the two-phase coordinate system.

In a possible design, the control apparatus further includes a phase-locked loop module, and the phase-locked loop module includes a unit for converting the three-phase coordinate system and the two-phase coordinate system, a proportional integral regulator, and an integrator. The unit for converting the three-phase coordinate system and the two-phase coordinate system is configured to: calculate a q-axis component of the power grid voltage in the two-phase coordinate system based on the power grid voltage and the conversion relationship between the three-phase coordinate system and the two-phase coordinate system, and input the q-axis component of the power grid voltage in the two-phase coordinate system into the proportional integral regulator. The proportional integral regulator is configured to: receive the q-axis component of the power grid voltage in the two-phase coordinate system, generate a rotation frequency parameter, and input the rotation frequency parameter into the integrator. The integrator is configured to: receive the rotation frequency parameter, generate the phase angle of the power grid voltage, and provide the phase angle to the processing module.

In a possible design, when determining a phase angle difference between a phase angle of a voltage output by the power converter and a phase angle of a power grid voltage, the processing module is configured to: calculate the d-axis component and the q-axis component of the power grid voltage in the two-phase coordinate system based on the power grid voltage and the conversion relationship between the three-phase coordinate system and the two-phase coordinate system; and determine the phase angle difference according to a preset function, and the d-axis component and the q-axis component of the power grid voltage in the two-phase coordinate system.

In a possible design, the processing module is further configured to: before calculating the d-axis component id and the q-axis component iq of the power grid current in the two-phase coordinate system, adjust a parameter of the proportional integral regulator or a parameter of the integrator, to increase a speed of a generated phase angle of the power grid voltage to be equal to a speed of the phase angle of the power grid voltage.

In a possible design, the processing module is further configured to: after using a sum of the first modulation voltage and the compensation voltage as the total modulation voltage, if a phase angle difference between a most recently determined phase angle of the voltage output by the power converter and a phase angle of a voltage on a cable is less than a second angle threshold, where the second angle threshold is less than the first angle threshold, perform the following process: determining the d-axis current reference value based on a voltage at a direct current capacitor in the power converter, and determining the q-axis current reference value based on reactive power of the power converter; and calculating a second modulation voltage of the power converter based on the d-axis current reference value, the q-axis current reference value, and the power grid current. A control signal of the power converter generated based on the second modulation voltage is used to drive the power converter to output an active current that is the d-axis current reference value and to output a reactive current that is the q-axis current reference value.

According to a third aspect, this application provides a power conversion system, which may include the control apparatus and the power converter according to the second aspect and any design in the second aspect, and a power converter. The control apparatus is configured to control the power converter, so that the power converter outputs electric energy to a power grid.

According to a fourth aspect, this application provides a computer-readable storage medium. The computer-readable storage medium stores computer instructions, and when the computer instructions in the computer-readable storage medium are executed by a control apparatus, the control apparatus is enabled to perform the method according to any design in the first aspect.

According to a fifth aspect, this application provides a computer program product. The computer program product includes computer instructions, and when the computer instructions are executed by a control apparatus, the control apparatus is enabled to perform the method according to any design in the first aspect.

For a technical effect that can be achieved by any possible design in any one of the second aspect to the fifth aspect, refer to the technical effect that can be achieved by any possible design in the first aspect. Details are not described herein again.

DESCRIPTION OF EMBODIMENTS

Figure 1A:
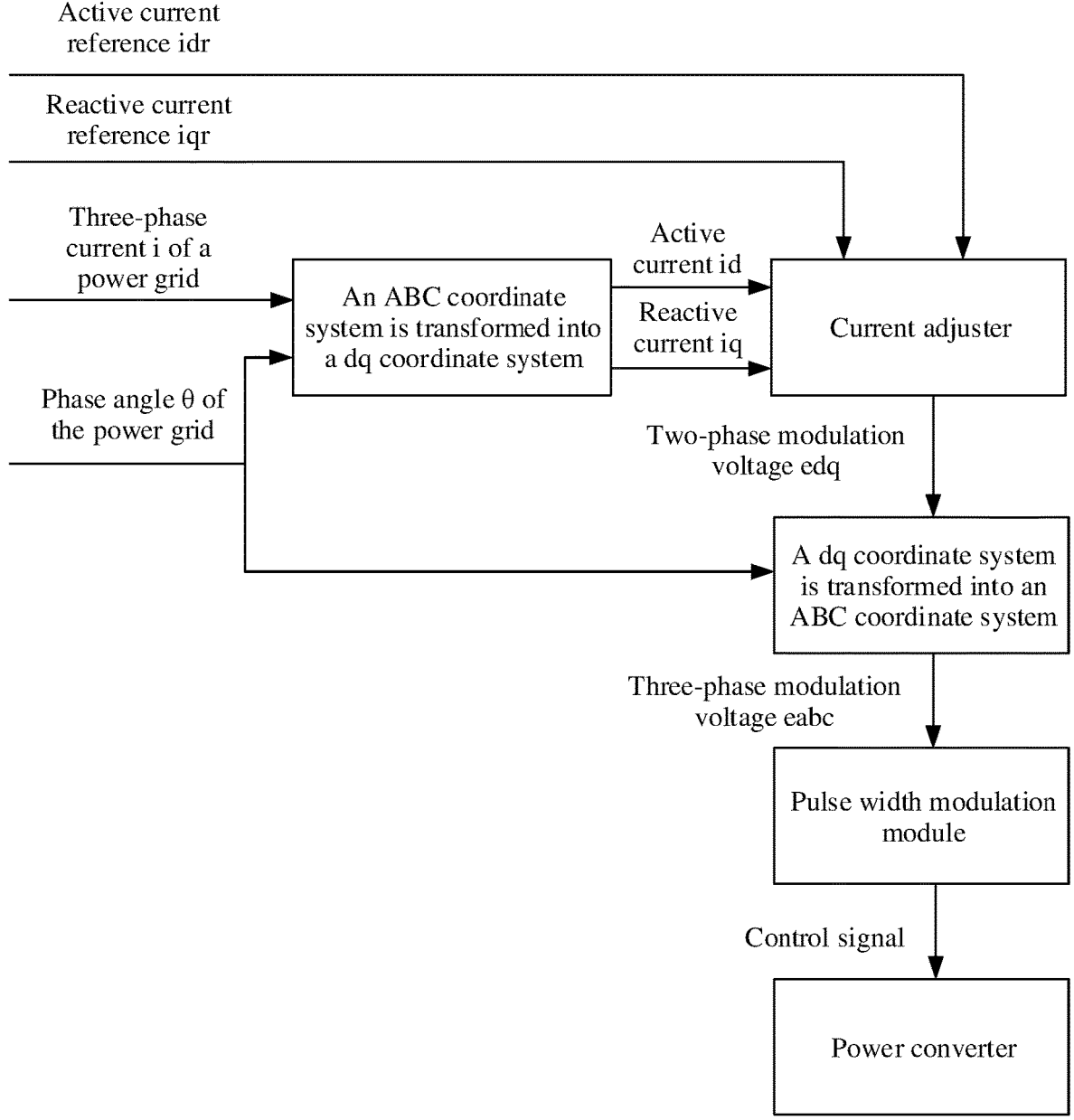
FIG. 1(a) to FIG. 1(c) are a schematic diagram of a control process of a power converter.
Figure 1B:
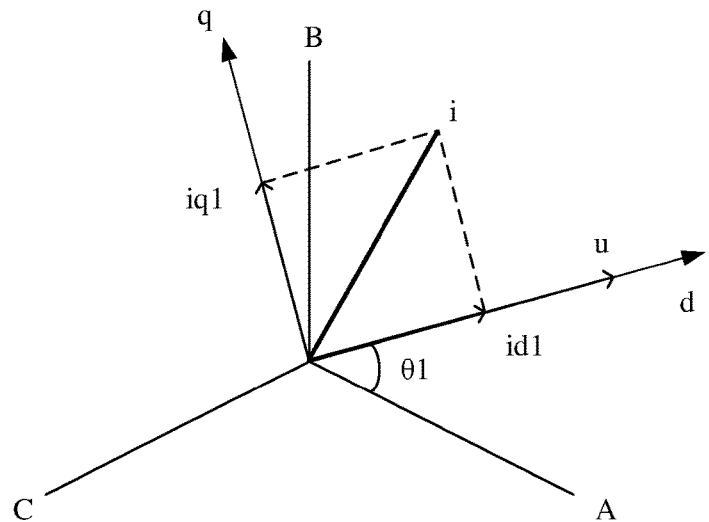

To make the objectives, technical solutions, and advantages of this application clearer, the following further describes this application in detail with reference to the accompanying drawings. It is clear that the described embodiments are only some rather than all of embodiments of this application. The power converter and the application scenarios described in embodiments of this application are intended to describe the technical solutions in embodiments of this application more clearly, and do not constitute a limitation on the technical solutions provided in embodiments of this application. A person skilled in the art may learn that, as a new application scenario emerges, the technical solutions provided in embodiments of this application are also applicable to a similar technical problem.

A future evolution direction of an energy system is to build a new power system in which new energy power generation acts as a main part. Wind power generation and photovoltaic power generation will be main parts of the future power system, and thermal power generation (such as coal-fired power) will become an auxiliary part. Compared with a traditional power system, the new power system will include a high proportion of power electronic devices, and face some technical problems that cannot be met or resolved in the traditional power system. Even in some extreme scenarios, the new power system may not adapt to an operating requirement of a high proportion of new energy power grids.

In a power system, a phase angle jump often occurs in a power grid voltage. The phase angle jump in the power system is caused by a sudden change in a circuit structure of the power grid. Typical sudden changes may include a three-phase symmetrical fault, a three-phase asymmetric fault, fault recovery, and islanding. In the traditional power system, a synchronous generator with a strong capacity and a strong power grid support capability is usually connected to each important node. This can minimize a sharp change in a voltage, frequency and phase of a three-phase alternating current.

A quantity of power electronic devices (such as power converters) increases in the power system, but a main part of new energy power generation usually does not have a power grid support capability. As a result, system inertia (a capability of stabilizing a system status, such as a capability of maintaining a power grid frequency) decreases continuously, and power grid strength becomes weak accordingly. Consequently, a system frequency fluctuates greatly, and a phase jump is more severe.

In the power system, when a large phase angle jump occurs in the power grid voltage, a power converter control system and an electrical quantity such as a voltage and a current output by the power converter control system cannot instantaneously track the phase angle jump. In this case, the power converter needs to be synchronized with a voltage phase of the power system again, so that the power converter can be controlled and return to a normal operating state. A phase-locked loop (or referred to as a phase-locked control loop) in the power converter is a control loop that is used to synchronize a voltage output by the power converter with a voltage of the power system.

Figure 1C:
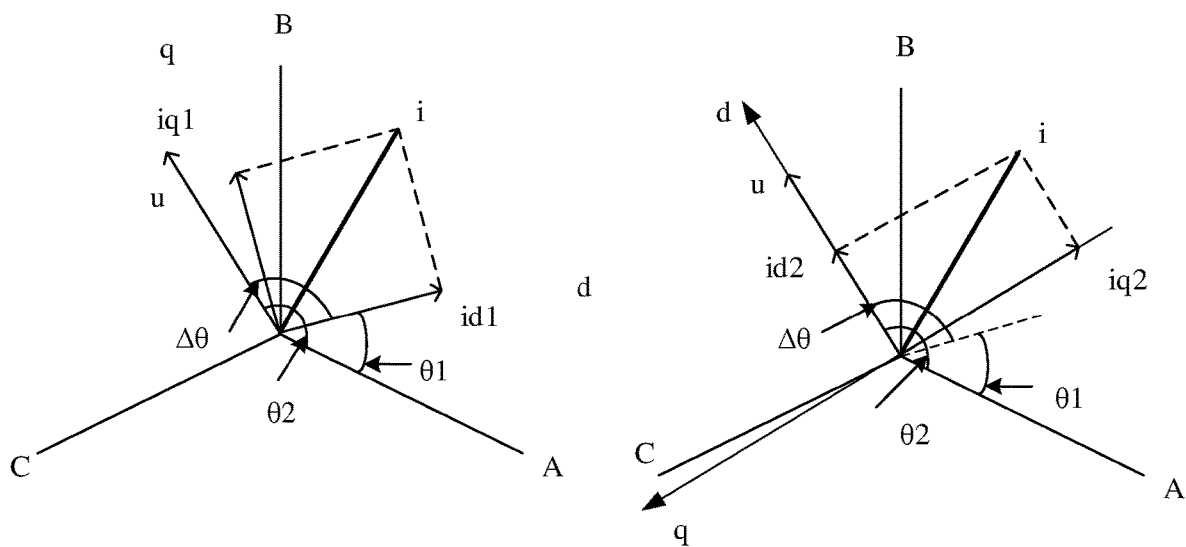
Figure 2:
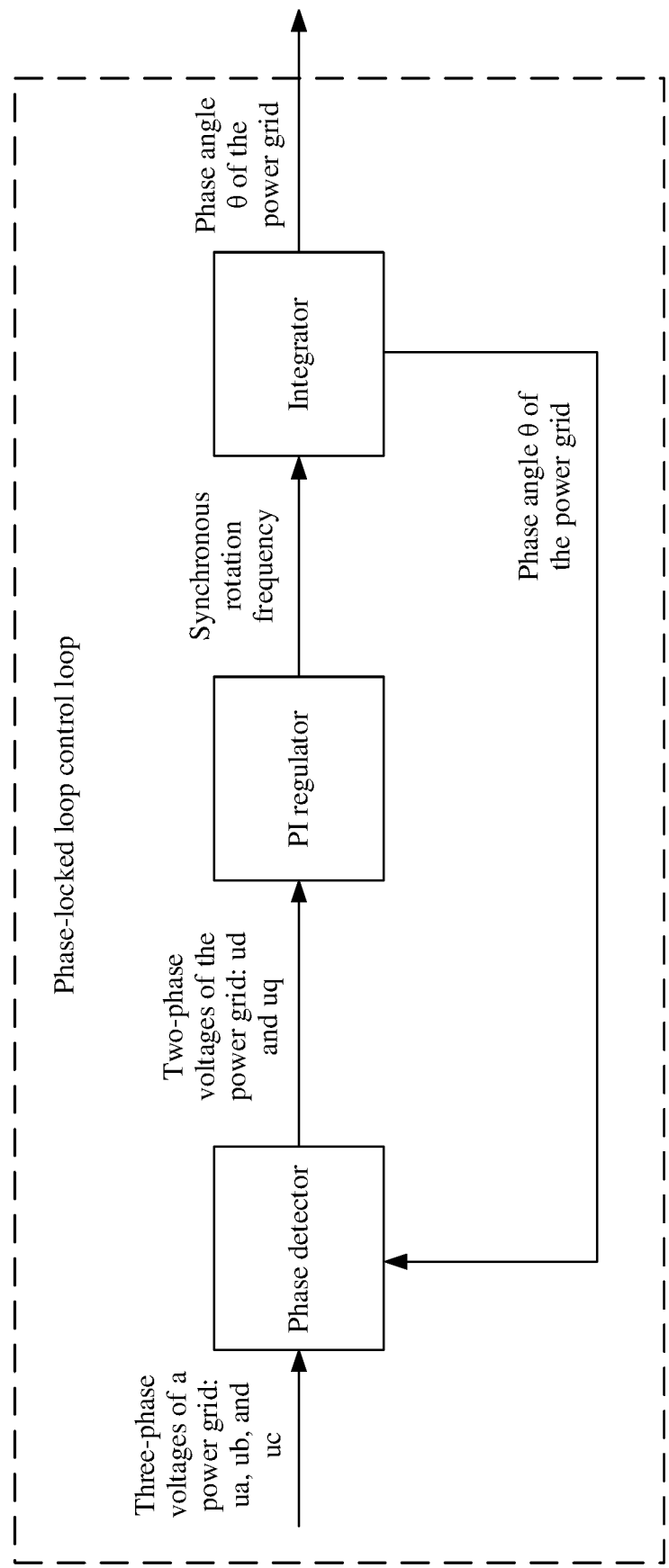
FIG. 2 is a schematic diagram of a structure of a phase-locked loop control loop.

Phase locking is usually performed the phase-locked loop by using power grid voltage information. FIG. 2 shows a phase-locked loop control loop. A phase detector calculates a q-axis component of a power grid voltage u based on a three-phase voltage of a power grid and a most recently determined phase angle θ of the power grid. The q-axis component of the power grid voltage u is input to a proportional integral (PI) regulator. The PI regulator can output a rotation frequency parameter. The rotation frequency parameter is input into an integrator, to generate and feedback the phase angle θ of the power grid to the phase detector. In the phase-locked loop control loop, a gain of a feedback loop of the phase angle of the power grid changes with a loop operating point. When a phase difference between the phase angle output by the power grid and an actual phase angle of the power grid is less than 90°, the gain of the feedback loop in the phase-locked loop control loop changes monotonically. However, when a phase difference exceeds 90°, the gain of the feedback loop decreases with increase of the phase difference. This greatly reduces a bandwidth of the phase-locked loop control loop. It can be learned that a more severe phase jump of the power grid requires more time to lock a phase of the power grid voltage. However, in a re-locking process, because the bandwidth of the phase-locked loop control loop is reduced, a determined phase angle of the power grid deviates greatly from the actual phase angle of the power grid. This is a time point when the power converter is most needed to quickly recover synchronization with the power system. In an extreme case, a phase angle jump of 180° occurs. In this case, the phase-locked loop control loop operates at an unstable balance point. Only after the system is disturbed, the phase-locked loop control loop is disconnected from the unstable balance point and is controlled at a stable balance point. That is, the phase-locked loop control loop recovers synchronization with the phase of the power grid voltage again. In the foregoing dynamic process, there is a large phase difference between a phase output by the phase-locked loop and the phase of the power grid voltage. Refer to FIG. 1(c). If a d-axis component id1 and a q-axis component iq1 of a power grid feedback current are calculated based on the phase θ1 output by the phase-locked loop, id1 and iq1 are greatly different from a d-axis component id2 and a q-axis component iq2 of the power grid feedback current that are calculated based on an actual phase θ2 of the power grid. In a severe case, id1 may be a positive value, but actual id2 is a negative value. As a result, the power converter that should output power to the power grid changes to absorbing power from the power grid in a specific time period. Power on the power grid backfeeds to a direct current capacitor in the power converter. As a result, overvoltage occurs in the direct current capacitor, which affects the power converter and the power grid. In this case, a power grid connection standard may not be met. In a severe case, the power converter may even break down.

In a solution, a phase locking speed of the phase-locked loop is increased by adjusting an architecture of the phase-locked loop. In this manner, a large phase error still exists at a moment of a phase jump of the power grid voltage. After the phase jump, the power converter has a risk of large transient impact, and there is unknown impact imposed by the change in the architecture of the phase-locked loop on operating stability and dynamic performance of the power converter. In another solution, a phase compensation circuit is used to obtain a phase shifted signal, and the phase shifted signal is used to compensate for a phase angle output by the phase-locked loop. This manner is greatly affected by voltage sampling. When voltage quality and power quality of the system are poor, or voltage quality and power quality of the system are strongly coupled to output of the power converter, fluctuation is likely to occur in a process of controlling the power converter, which may affect a transient control effect of the power converter.

In view of this, this application provides a power converter control method and a control apparatus, to protect a power converter when a large phase jump occurs in a power grid voltage and reduce a power backfeed degree. This can reduce impact imposed by the power in the power grid on the power converter, improve transient performance of the power converter, and ensure transient safety of the power converter.

Figure 3:
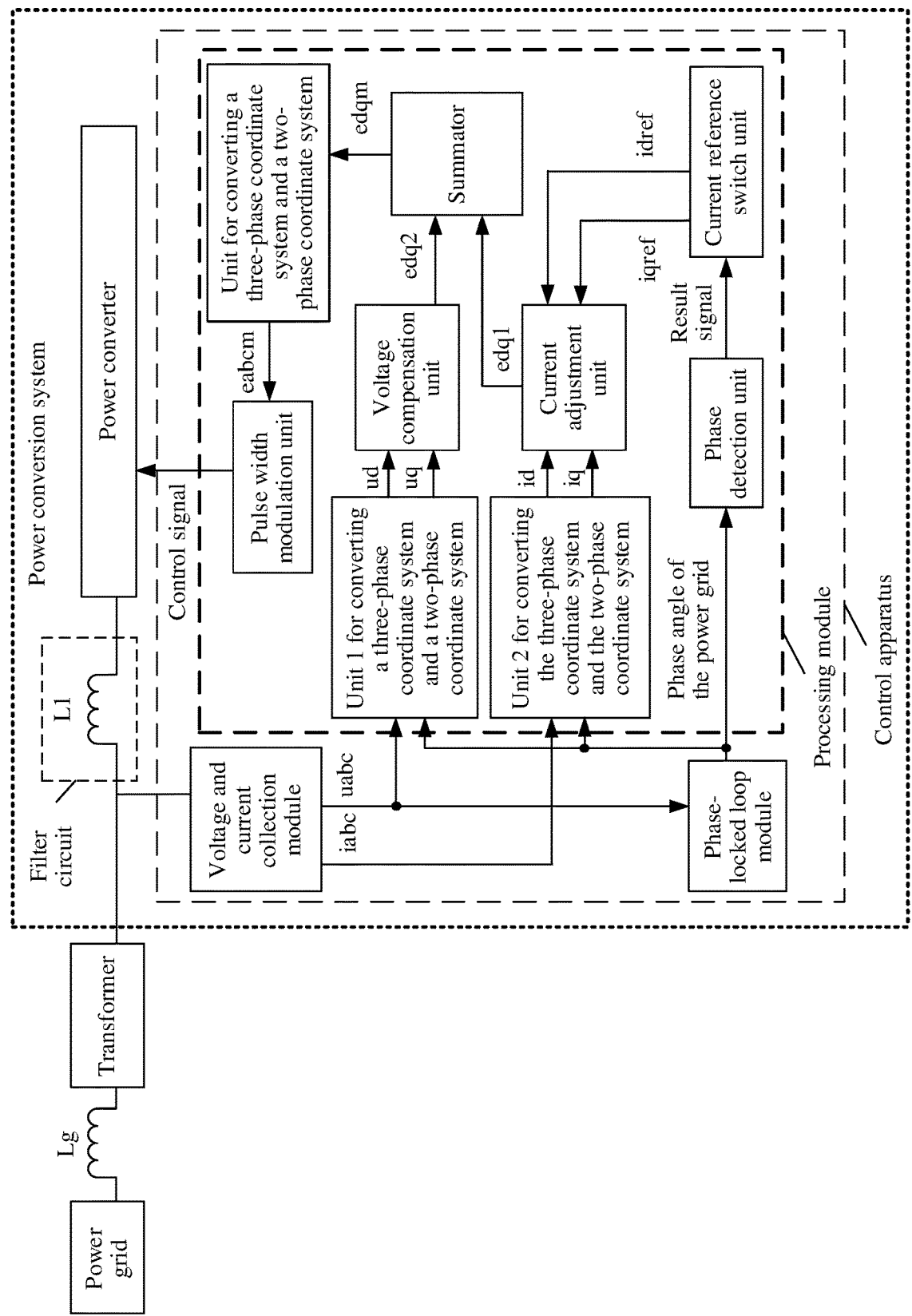
FIG. 3 is a schematic diagram of a structure of a power conversion system.

First, this application provides a power conversion system. As shown in FIG. 3, the power conversion system may include a control apparatus provided in an embodiment of this application and at least one power converter. Each power converter may include a three-level inverter circuit and a direct current capacitor. The direct current capacitor may be connected to a direct current power supply. Driven by the control apparatus, the inverter circuit may convert direct current energy at the direct current capacitor into alternating current energy, and input the alternating current energy to a power grid.

In some examples, a power conversion system may be implemented as a photovoltaic power generation system, and the direct current power supply may include elements such as a photovoltaic string, a direct current to direct current circuit, and a cable. The photovoltaic string may convert light energy into direct current energy, and the direct current to direct current circuit converts a voltage of the direct current energy output by the photovoltaic string, and outputs the converted electric energy to the direct current capacitor of the power converter. The power converter may convert the direct current energy, for example, convert a direct current into an alternating current, or change a voltage of the direct current energy, and output the direct current energy to a power grid or an off-grid system. In the power conversion system, an output end of a power converter, a filter circuit, and a transformer may usually be sequentially connected in series. The filter circuit may filter electric energy output by the power converter, and the filtered electric energy is transmitted to the power grid or the off-grid system through the transformer. The filter circuit may usually include an inductor L1. An inductor Lg in FIG. 3 is an equivalent inductor of a cable between the transformer and the power grid or the off-grid system. For ease of description, this embodiment of this application uses the power grid as an example for description.

The following describes the control apparatus provided in this embodiment of this application. As shown in FIG. 3, the control apparatus may include a voltage and current collection module and a processing module.

The voltage and current collection module may be configured to collect a voltage uabc or a current iabc on the power grid, and usually collect a voltage or a current between the inductor L1 and the transformer. The voltage and current collection module may include a voltage collection circuit or a current collection circuit, and provide a collected power grid voltage and a collected power grid current to the processing module. A distance between the power grid and the power converter is large, and it takes a long time to obtain voltage information of the power grid. In addition, when a phase jump occurs in the power grid voltage, a change of the power grid voltage is transferred to the power converter. Therefore, the voltage and current collection module may collect a generator output voltage or a generator output current, and use the generator output voltage or the generator output current as the power grid voltage or the power grid current. As shown in FIG. 3, the voltage and current collection module may collect a voltage and a current on a side that is of the filter circuit and that is not connected to the power converter, that is, the generator output voltage or the generator output current. The power grid voltage and the power grid current in this embodiment of this application may be the generator output voltage or the generator output current.

The processing module may control the power converter based on the power grid voltage and the power grid current that are provided by the voltage and current collection module, to change a voltage or a current of the electric energy output by the power converter. The processing module may include one or more control circuits, or one or more controllers (or processors). In some examples, the processing module may include an element that has a data processing capability, such as a field programmable gate array (FPGA), a single-chip microcomputer, or a digital signal processor (DSP).

As shown in FIG. 3, the processing module may control the power converter by using the power grid voltage, a power grid circuit, and a phase angle (or referred to as a phase angle of the power grid voltage) of the power grid. In this case, a phase of a voltage output by the power converter is the same as a phase of the power grid voltage, in other words, a phase of the power converter and a phase of the power grid are phase synchronous. The control apparatus may include a phase-locked loop module. The phase-locked loop module is configured to determine the phase of the power grid voltage.

In some examples, the phase-locked loop module may include a phase-locked loop circuit. The phase-locked loop circuit is a feedback circuit, and has a capability of phase synchronization between a synchronization signal in the processing module and a specific external signal reference (for example, a signal reference of the power grid). A voltage-controlled crystal oscillator in the phase-locked loop circuit may output a synchronization signal. Synchronization is implemented by comparing a phase of the external signal reference and a phase of the synchronization signal. In a comparison process, the phase-locked loop circuit may continuously adjust a phase of the synchronization signal of the voltage-controlled crystal oscillator based on the phase of the external signal reference, until the phases of the two signals are synchronized.

Figure 4:
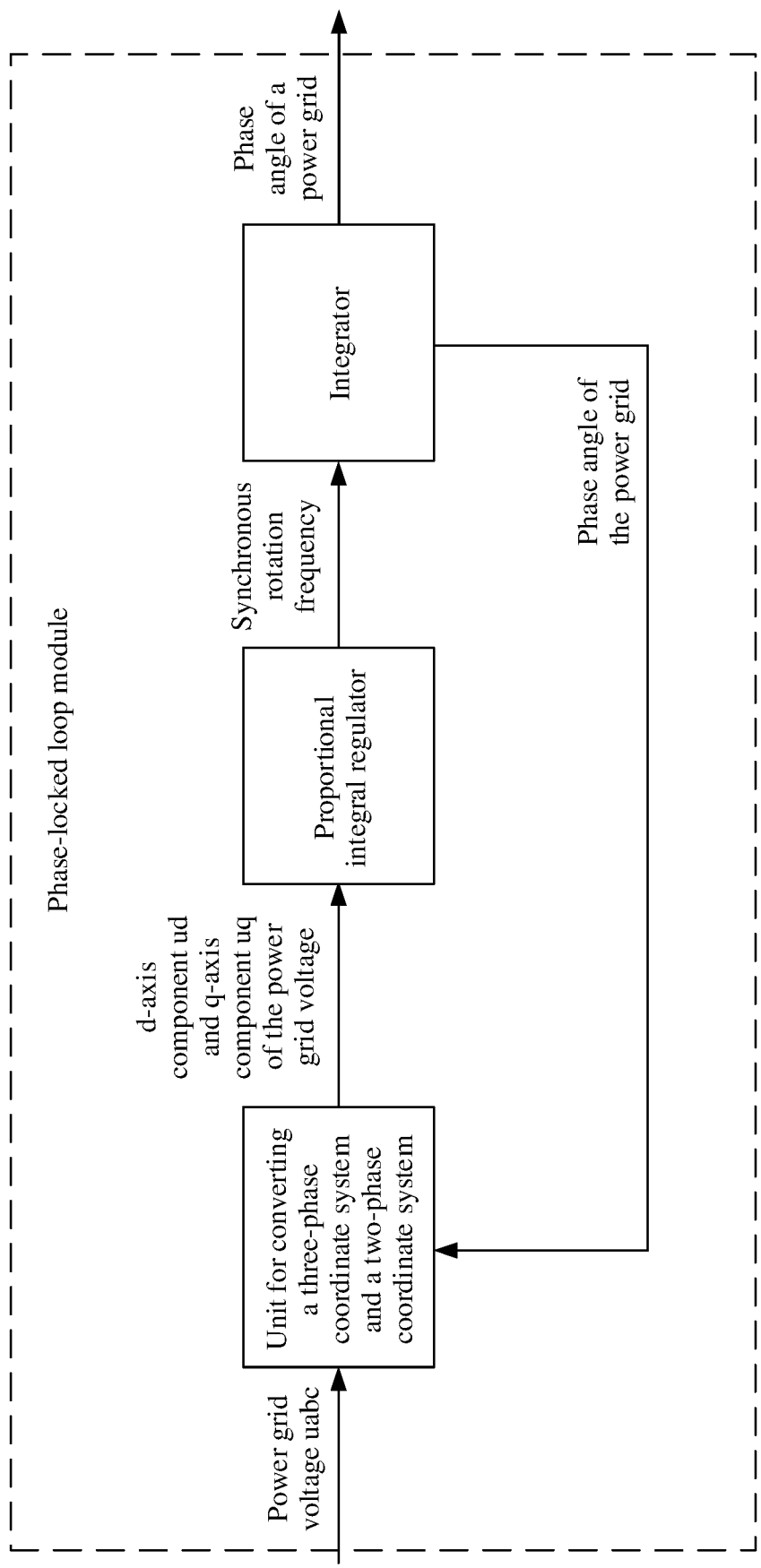
FIG. 4 is a schematic diagram of a structure of a phase-locked loop module.

In some other examples, the phase-locked loop module may include a unit for converting a three-phase coordinate system and a two-phase coordinate system, a proportional integral regulator, and an integrator. FIG. 4 shows a phase-locked loop control loop according to an example embodiment. The phase-locked loop control loop includes a phase feedback loop of a power grid.

A unit for converting a three-phase coordinate system and a two-phase coordinate system may be configured to determine a two-phase phase-locked loop coordinate system based on received angle information (such as a phase of the power grid). For example, in the three-phase coordinate system (an ABC coordinate system), the two-phase coordinate system (a dq coordinate system) is rotated, and a rotation angle is the phase of the power grid provided by the feedback loop. In this case, an included angle between a positive direction of a d-axis in the rotated dq coordinate system and a positive direction of an A-axis in the three-phase coordinate system is a phase angle of the power grid provided by the feedback loop. The rotated dq coordinate system may be usually referred to as a phase-locked loop coordinate system. Then, a d-axis component and a q-axis component of an input parameter are determined based on the phase-locked loop coordinate system and the parameter. It should be noted that determining a d-axis component and a q-axis component of any parameter in this application means a d-axis component or a q-axis component in the phase-locked loop coordinate system, or a d-axis component or a q-axis component in a target two-phase coordinate system, and an included angle between a positive direction of a d-axis in the target two-phase coordinate system and the positive direction of the A-axis in the three-phase coordinate system is the phase angle of the power grid.

A unit for converting a three-phase coordinate system and a two-phase coordinate system in a phase-locked loop module may determine the phase-locked loop coordinate system based on the phase angle in the phase feedback loop.

A d-axis component ud and a q-axis component uq of a power grid voltage are determined based on a received power grid voltage.

The unit for converting the three-phase coordinate system and the two-phase coordinate system inputs a q-axis component uq of the power grid voltage in the two-phase coordinate system into a proportional integral regulator. The proportional integral regulator may be configured to receive a q-axis component uq of the power grid voltage in the phase-locked loop coordinate system, generate a rotation frequency parameter, and then input the rotation frequency parameter to the integrator. The integrator is configured to: receive the rotation frequency parameter, generate the phase angle of the power grid (namely, a phase angle of the power grid voltage), and provide the phase angle to a processing module.

The processing module has a capability of determining whether a phase jump occurs in the power grid voltage. As shown in FIG. 3, the processing module may include a unit 1 for converting the three-phase coordinate system and the two-phase coordinate system. The unit 1 for converting the three-phase coordinate system and the two-phase coordinate system receives the phase angle of the power grid provided by the phase-locked loop module and a power grid voltage uabc provided by a voltage and current collection module.

The unit 1 for converting the three-phase coordinate system and the two-phase coordinate system may determine the phase-locked loop coordinate system based on the phase of the power grid provided by the phase-locked loop, and determine a d-axis component ud and a q-axis component uq of the power grid voltage uabc collected by the voltage and current collection module. For a data processing process of the unit 1 for converting the three-phase coordinate system and the two-phase coordinate system, refer to the data processing process of the unit for converting the three-phase coordinate system and the two-phase coordinate system. Details are not described herein again.

A jump detection unit in the processing module may calculate the phase angle difference based on the d-axis component ud and a q-axis component uq of the power grid voltage and a preset function, for example, $\Delta\theta = \text{atan}(ud, uq)$. $\Delta\theta$ is a phase angle difference between a phase of a voltage output by a power converter and a phase of the power grid voltage, ud is the d-axis component ud of the power grid voltage, and uq is the q-axis component of the power grid voltage.

The jump detection unit may determine, based on the phase angle difference and an angle threshold, whether a phase jump occurs in the power grid. If the phase angle difference $\Delta\theta$ is greater than or equal to a first angle threshold, the first angle threshold may be greater than or equal to 90°. The angle threshold indicates a minimum value of the phase angle difference occurring when the phase jump occurs in the power grid. If the phase angle difference $\Delta\theta$ is less than a first angle threshold, it indicates that no severe phase jump occurs in the power grid voltage. If the phase angle difference $\Delta\theta$ greater than or equal to the first angle threshold, it indicates that a severe phase jump (or a large phase jump) occurs in the power grid voltage. If a control manner of the power converter is not changed, power on the power grid may backfeed to the power converter, which affects the power converter.

The jump detection unit may output a result signal indicating whether a phase jump occurs in the power grid to another unit. For example, if determining that the phase angle difference $\Delta\theta$ is greater than or equal to the first angle threshold, the jump detection unit outputs a first result signal to each of a current reference switch unit and a voltage compensation unit. If determining that the phase angle difference $\Delta\theta$ is less than the first angle threshold, the jump detection unit outputs a second result signal to each of a current reference switch unit and a voltage compensation unit.

In a possible design, in a process in which the jump detection unit determines, for a plurality of times, whether a phase jump occurs in the power grid, different angle thresholds may be used to determine whether the phase jump occurs in the power grid. When determining, for first time, whether the phase jump occurs in the power grid, the jump detection unit uses the first angle threshold, and determines whether the phase angle difference $\Delta\theta$ is greater than or equal to the first angle threshold.

In a possible case, when determining whether the phase jump occurs in the power grid this time, if the jump detection unit determines that the phase angle difference $\Delta\theta$ is greater than or equal to the first angle threshold, the jump detection unit outputs the first result signal (that is, a phase jump occurs in the power grid voltage). When determining whether the phase jump occurs in the power grid next time, the jump detection unit uses a second angle threshold. If the jump detection unit may determine whether the phase angle difference $\Delta\theta$ is less than the second angle threshold. The second angle threshold may be less than the first angle threshold, and the second angle threshold may indicate a maximum angle of the phase angle difference occurring when a phase jump does not occur in the power grid. If the phase angle difference $\Delta\theta$ is less than the second angle threshold, it may indicate that phase locking is successful. If the phase angle difference $\Delta\theta$ is greater than or equal to the second angle threshold, it may indicate that phase locking fails, and a difference between a phase angle of a voltage output by the power converter and the phase angle of the power grid voltage is large. If determining that the phase angle difference $\Delta\theta$ is less than the second angle threshold, the jump detection unit outputs the second result signal to each of a current reference switch unit and a voltage compensation unit. If determining that the phase angle difference $\Delta\theta$ is greater than or equal to the second angle threshold, the jump detection unit outputs the first result signal to each of a current reference switch unit and a voltage compensation unit.

In another possible case, if determining whether the phase jump occurs in the power grid this time, if the jump detection unit determines that the phase angle difference $\Delta\theta$ is less than the second angle threshold, the jump detection unit outputs the second result signal (that is, a difference between a phase of the voltage output by the power converter and the phase of the power grid voltage is small). When determining whether the phase jump occurs in the power grid next time, the jump detection unit uses the first angle threshold.

In a possible design, the jump detection unit may determine, based on the q-axis component uq of the power grid voltage and a voltage threshold uqthr, where a severe phase jump occurs in the power grid voltage. For example, if $|uq| < uqthr$, it may indicate that the phase of a voltage output by the power converter is close to the phase of the power grid voltage, that is, it may indicate that no severe phase jump occurs in the power grid voltage. If $|uq| \geq uqthr$, it may indicate that a severe phase jump occurs in the power grid voltage.

The processing module may include a unit 2 for converting the three-phase coordinate system and the two-phase coordinate system. The unit 2 for converting the three-phase coordinate system and the two-phase coordinate system receives the phase angle of the power grid provided by the phase-locked loop module and a power grid current iabc provided by a voltage and current collection module. The unit 2 for converting the three-phase coordinate system and the two-phase coordinate system may determine the phase-locked loop coordinate system based on the phase of the power grid provided by the phase-locked loop, and determine a d-axis component id and a q-axis component iq of the power grid current iabc collected by the voltage and current collection module. For a data processing process of the unit 2 for converting the three-phase coordinate system and the two-phase coordinate system, refer to the data processing process of the unit for converting the three-phase coordinate system and the two-phase coordinate system. Details are not described herein again.

The processing module may include the current reference switch unit. The current reference switch unit may adjust an output d-axis current reference value idref and an output q-axis current reference value iqref based on the result signal output by the jump detection unit for determining whether a severe phase jump occurs. The d-axis current reference value idref and the q-axis current reference value iqref are used to determine a modulation voltage of the power converter.

If determining that a received result signal is the first result signal, the current reference switch unit outputs preset fixed values, that is, sets the d-axis current reference value idref and the q-axis current reference value iqref to the preset fixed values. The preset fixed value may be 0 or a smaller value. If determining that a received result signal is the second result signal, the current reference switch unit determines the d-axis current reference value idref based on a voltage at a direct current capacitor in the power converter, and outputs the d-axis current reference value idref to a current adjustment unit, and the current reference switch unit determines the q-axis current reference value iqref based on reactive power of the power converter, and outputs the q-axis current reference value iqref to the current adjustment unit.

The processing module may include the current adjustment unit. The current adjustment unit may receive the d-axis current reference value idref and the q-axis current reference value iqref that are output by the current reference switch unit, and receive the d-axis component id and the q-axis component iq of the power grid current that is output by the unit 2 for converting the three-phase coordinate system and the two-phase coordinate system. A first modulation voltage edq1 of the power converter is calculated based on the d-axis current reference value idref, the q-axis current reference value iqref, and the d-axis component id and the q-axis component iq of the power grid current. The first modulation voltage edq1 is used to determine a total modulation voltage edqm of the power converter. The total modulation voltage edqm is used to generate a control signal of the power converter.

The voltage compensation unit in the processing module may receive the d-axis component id and the q-axis component iq of the power grid current that is output by the unit 2 for converting the three-phase coordinate system and the two-phase coordinate system, and the result signal output by the jump detection unit, for example, the first result signal or the second result signal. If determining that the received result signal is the first result signal, the voltage compensation unit may calculate a compensation voltage edq2 of the power converter based on a preset virtual resistance parameter K, and the d-axis component id and the q-axis component iq of the power grid current. The compensation voltage edq2 is used to compensate the first modulation voltage edq1 when the total modulation voltage edqm of the power converter is determined. If determining that the received result signal is the second result signal, the voltage compensation unit does not calculate or output a compensation voltage edq2 of the power converter.

The processing module further includes a summator, which may receive the first modulation voltage edq1 output by the current adjustment unit, receive the compensation voltage edq2 output by the voltage compensation unit, add the received two voltages to obtain the total modulation voltage edqm, and output the total modulation voltage edqm.

When the result signal received by the voltage compensation unit is the first result signal, the voltage compensation unit outputs the compensation voltage edq2 to the summator. In this case, the summator adds the compensation voltage edq2 output by the voltage compensation unit and the first modulation voltage edq1 output by the current adjustment unit, to generate and output the total modulation voltage edqm. When the result signal received by the voltage compensation unit is the second result signal, the voltage compensation unit does not output the compensation voltage edq2 to the summator. In this case, the summator adds the first modulation voltage edq1 output by the current adjustment unit and 0, to generate and output the total modulation voltage edqm. In this case, the total modulation voltage edqm is equal to the first modulation voltage edq1 output by the current adjustment unit.

The processing module may include the unit for converting the three-phase coordinate system and the two-phase coordinate system. The unit for converting the three-phase coordinate system and the two-phase coordinate system may be configured to determine a two-phase phase-locked loop coordinate system based on received angle information (such as a phase of the power grid). For example, coordinate transformation is performed on the three-phase coordinate system (the ABC coordinate system) based on the phase angle of the power grid. A transformed dq coordinate system may be generally referred to as the phase-locked loop coordinate system. An included angle between a positive direction of a d-axis in the transformed dq coordinate system and a positive direction of an A-axis in the three-phase coordinate system is a phase angle of the power grid provided by the feedback loop. Then, a vector corresponding to an input parameter in the three-phase coordinate system is determined based on a conversion relationship between the phase-locked loop coordinate system and the three-phase coordinate system. It should be noted that determining a d-axis component and a q-axis component of any parameter in this application means a d-axis component or a q-axis component in the phase-locked loop coordinate system, or a d-axis component or a q-axis component in a target two-phase coordinate system, and an included angle between a positive direction of a d-axis in the target two-phase coordinate system and the positive direction of the A-axis in the three-phase coordinate system is the phase angle of the power grid voltage.

The processing module may include the unit for converting the three-phase coordinate system and the two-phase coordinate system, may determine the conversion relationship between the phase-locked loop coordinate system and the three-phase coordinate system based on the phase angle provided by the phase-locked loop module, and determine, based on the conversion relationship between the phase-locked loop coordinate system and the three-phase coordinate system, a three-phase modulation voltage eabcm in the three-phase coordinate system that corresponds to the total modulation voltage edqm in the phase-locked loop coordinate system. The three-phase modulation voltage eabcm is used to generate a control signal or a drive signal of a three-level inverter.

The processing module may include a pulse width modulation unit, which may generate, based on the three-phase modulation voltage eabcm, the control signal or the drive signal of the three-phase inverter circuit in the power converter. The processing module outputs the generated control signal or drive signal of the three-phase inverter circuit to the three-phase inverter circuit, to control a voltage or a current of electric energy output by the three-phase inverter circuit.

In a possible design, the processing module may include a filter, configured to filter the d-axis component id and the q-axis component iq of the power grid current that is output by the unit 2 for converting the three-phase coordinate system and the two-phase coordinate system, to eliminate noise signals of the power grid current in the d-axis component (id) and the q-axis component iq, for example, noise caused by sampling and digital control. In this design, the voltage compensation unit in the processing module may receive the d-axis component id' and the q-axis component iq' of the power grid current that is output by the filter, and the result signal output by the jump detection unit, for example, the first result signal or the second result signal. If determining that the received result signal is the first result signal, the voltage compensation unit may calculate the compensation voltage edq2 of the power converter based on the preset virtual resistance parameter K, and the d-axis component id and the q-axis component iq of the filtered power grid current.

In this embodiment of this application, when no phase jump occurs in the power grid, the d-axis current reference value idref output by the current reference switch unit is determined based on the voltage at the direct current capacitor in the power converter. In addition, the output q-axis current reference value iqref is determined based on the reactive power of the power converter. A modulation voltage determined by the current adjustment unit based on the d-axis current reference value idref, the q-axis current reference value iqref, the d-axis component id and the q-axis component iq of the power grid current is denoted as a modulation voltage edq3. In this case, the voltage compensation unit does not output a signal. The summator outputs the modulation voltage edq3 to the unit for converting the three-phase coordinate system and the two-phase coordinate system. The processing module generates the control signal or a drive signal of the power converter based on the modulation voltage edq3, so that the voltage output by the power converter may be the modulation voltage edq3. In this case, an active current part in a current output by the power converter is close to the d-axis current reference value idref, a reactive current part in the current output by the power converter is close to the q-axis current reference value iqref, and the phase of the voltage output by the power converter is the same as the phase of the power grid voltage.

Figure 5:
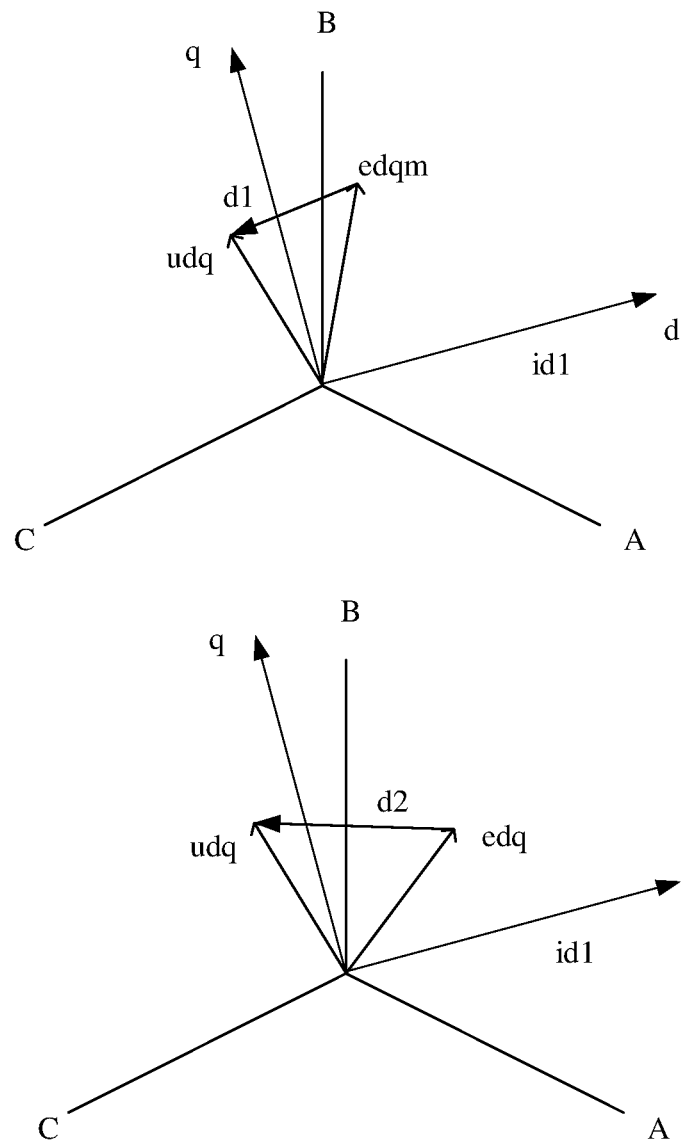
FIG. 5 is a schematic diagram of a modulation voltage of a power converter.

It is assumed that when no phase jump occurs in the power grid, the voltage output by the power converter in the phase-locked loop coordinate system is denoted as edq. When a phase jump occurs in the power grid, a difference between the phase angle of the power grid provided by the phase-locked loop module and an actual phase angle of the power grid is large. Therefore, parameters output by the unit 1 for converting the three-phase coordinate system and the two-phase coordinate system and the unit 2 for converting the three-phase coordinate system and the two-phase coordinate system may also be inaccurate. In this case, the d-axis current reference value idref and the q-axis current reference value iqref that are output by the current reference switch unit are preset fixed values, so that the total modulation voltage edqm is controllable. The current adjustment unit determines the first modulation voltage edq1 based on the preset fixed values, the d-axis component id and the q-axis component iq of the power grid current. The voltage compensation unit calculates the compensation voltage edq2 based on the d-axis component id and the q-axis component iq of the power grid current, and the preset virtual resistance parameter K. The summator adds the first modulation voltage edq1 and the compensation voltage edq2 to obtain the total modulation voltage edqm, and outputs the total modulation voltage edqm to the unit for converting the three-phase coordinate system and the two-phase coordinate system. The processing module generates the control signal or the drive signal of the power converter based on the total modulation voltage edqm, so that the voltage output by the power converter is the total modulation voltage edqm. As shown in FIG. 5, in an embodiment of this application, a vector difference d2 between a vector edq of a voltage output by a power converter and a power grid voltage vector udq in a phase-locked loop coordinate system when no phase jump occurs is greater than a vector difference d1 between a vector of a total modulation voltage edqm and the power grid voltage vector udq in the phase-locked loop coordinate system. In this design, a voltage compensation unit provides a compensation voltage edq2, which is equivalent to adding a virtual dynamic resistance to the power converter. This can reduce a difference between the voltage output by the power converter and a power grid voltage, and reduce a degree in which power on the power grid backfeeds to the power converter. In addition, this reduces fluctuation of active power and reactive power that are output by the power converter, and reduces transient impact on the power converter.

In a possible implementation, when a phase jump occurs in the power grid, a processing module may switch a working mode of a phase-locked loop module from a normal mode to a fast mode. For example, the processing module may adjust a parameter of the phase-locked loop module, for example, a parameter of a proportional integral regulator, or a parameter of an integrator, to increase a phase locking speed of the phase-locked loop module, that is, increase a bandwidth of a phase-locked loop, to increase a speed of determining the total modulation voltage edqm in the processing module. When no phase jump occurs in the power grid, a processing module may switch a working mode of a phase-locked loop module from a fast mode to a normal mode.

Based on a same concept, this application provides a power converter control method, which may be performed by a control apparatus. The control apparatus may perform all or some of steps in the power converter control method shown in FIG. 6A and FIG. 6B.

Step S101: Determine a phase angle difference between a phase angle of a voltage output by a power converter and a phase angle of a power grid voltage.

Step S102: Determine whether the phase angle difference is greater than or equal to a first angle threshold; if yes, perform step S103; or if no, perform step S104.

Step S103: Set a d-axis current reference value and a q-axis current reference value that are used to determine a modulation voltage of the power converter to preset fixed values.

In this embodiment of this application, if a large phase jump occurs in a power grid, the control apparatus sets the d-axis current reference value idref and the q-axis current reference value iqref to the preset fixed values. The preset fixed value may be zero or a smaller value close to zero.

Step S104: Determine a d-axis current reference value idref based on a voltage at a direct current capacitor in the power converter, and determine a q-axis current reference value iqref based on reactive power of the power converter.

In this embodiment of this application, if no large phase jump occurs in a power grid, the control apparatus may determine the d-axis current reference value idref based on the voltage at the direct current capacitor in the power converter, and determine the q-axis current reference value iqref based on the reactive power of the power converter. In this case, a control signal generated by the control apparatus may cause an active current part in a current output by the power converter to be close to the d-axis current reference value idref, and cause a reactive current part in the current output by the power converter to be close to the q-axis current reference value iqref. After performing step S104, the control apparatus performs step S111.

In a possible design, the control apparatus may adjust a parameter of a proportional integral regulator or a parameter of an integrator, to increase a speed of successful phase locking.

Step S105: Calculate a first modulation voltage of the power converter based on the d-axis current reference value, the q-axis current reference value, and a power grid current.

The d-axis current reference value idref and the q-axis current reference value iqref when a phase jump occurs in the power grid are different from the d-axis current reference value idref and the q-axis current reference value iqref when no phase jump occurs in the power grid. For differentiation, in step S105, the modulation voltage calculated based on the d-axis current reference value idref and the q-axis current reference value iqref that are determined in step S103 is denoted as the first modulation voltage. After performing step S104, the control apparatus performs step S106.

Step S106: Calculate a compensation voltage of the power converter based on a preset virtual resistance parameter and the power grid current. The compensation voltage is used to compensate the first modulation voltage when a total modulation voltage of the power converter is determined.

In this embodiment of this application, when a large phase jump occurs in the power grid, the compensation voltage is generated based on the virtual resistance parameter, which may be considered as adding a virtual dynamic resistance to the power converter. This reduces fluctuation of the active power and the reactive power that are output by the power converter, and reduces transient impact on the device.

In this embodiment of this application, the control apparatus may synchronously perform the operations in step S105 and step S106, or may first perform the operation in step S105 and then perform the operation in step S106. Alternatively, the control apparatus may first perform the operation in step S106, and then perform the operation in step S105. In other words, a sequence of step S105 and step S106 is not limited in this application.

Step S107: Use a sum of the first modulation voltage and the compensation voltage as the total modulation voltage. A difference between the total modulation voltage and the power grid voltage is less than a difference between a voltage output by the power converter and the power grid voltage.

In this embodiment of this application, when a large phase jump occurs in the power grid, the compensation voltage is generated based on the virtual resistance parameter. The first modulation voltage is compensated by using the compensation voltage, so that a vector difference d1 between a vector of a modulation voltage (namely, the total modulation voltage) used to generate a control signal of the power converter and a power grid voltage vector is less than a vector difference d2 between a vector of the voltage output by the power converter and the power grid voltage vector. When a large phase jump occurs in the power grid, this reduces a difference between the voltage output by the power converter and the power grid voltage, for example, a voltage amplitude difference or a voltage phase difference, and reduces a degree in which power on the power grid backfeeds to the power converter. In this way, the power converter is protected, transient impact on the power converter is reduced.

Step S108: Based on the total modulation voltage, generate a control signal for driving the power converter, and drive the power converter.

For example, the control apparatus may generate the control signal of the power converter based on the total modulation voltage and a PWM modulation technology, and apply the control signal to the power converter to drive the power converter to output the total modulation voltage.

Step S109: Determine a phase angle difference between a phase angle of the voltage output by the power converter and a phase angle of the power grid voltage.

After performing step S108, the control apparatus may re-determine the phase angle difference between the phase angle of the voltage output by the power converter and the phase angle of the power grid voltage.

Step S110: Determine whether the phase angle difference is less than a second angle threshold; if yes, perform step S103; or if no, perform step S111 next.

In another possible design, when performing step 110, the control apparatus may perform the following steps: determine whether an absolute value |uq| of a q-axis component uq of the power grid voltage is less than a voltage threshold uqthr; if yes, perform step S111 next; or if no, perform step S103 next. In other words, the control apparatus may further determine, based on the q-axis component of the power grid voltage and the voltage threshold, whether phase locking is successful.

The control apparatus may re-determine the phase angle difference, to determine whether phase locking is successful or whether a phase jump occurs in the power grid voltage.

The second angle threshold may be less than the first angle threshold. If the phase angle difference is greater than or equal to the second angle threshold, it may indicate that the control apparatus fails to perform phase locking, and step S103 is performed next. If the phase angle difference is less than the second angle threshold, it may indicate that the control apparatus succeeds in phase locking. Step S111 is performed next, to restore normal drive of the power converter.

Step S111: Calculate a second modulation voltage of the power converter based on the d-axis current reference value, the q-axis current reference value, and a power grid current, and use the second modulation voltage as the total modulation voltage.

The d-axis current reference value idref and the q-axis current reference value iqref when a phase jump occurs in the power grid are different from the d-axis current reference value idref and the q-axis current reference value iqref when no phase jump occurs in the power grid. The modulation voltage calculated based on the d-axis current reference value idref and the q-axis current reference value iqref that are determined in step S104 is denoted as the second modulation voltage.

Step S112: Based on the second modulation voltage, generate a control signal for driving the power converter, and drive the power converter.

After performing step S112, the control apparatus may perform the process of step S101 to step S112 again, and dynamically adjust, based on a phase difference between a phase of the voltage output by the power converter and a phase of the power grid voltage, a manner of determining the modulation voltage for driving the power converter. When a phase jump occurs in the power grid, the control apparatus may determine the modulation voltage of the power converter through the process in step S103 to step S109. After phase locking is successful, the control apparatus may determine the modulation voltage of the power converter through the process in step S104, step S111, and step S112, and drive the power converter. When no phase jump occurs in the power grid, the control apparatus may determine the modulation voltage of the power converter through the process in step S104, step S111, and step S112, and drive the power converter.

In a possible scenario, if the power converter and the control apparatus are applied to a photovoltaic power generation system, the control apparatus may further control at least one photovoltaic string that provides direct current energy to the power converter to run in a maximum power tracking mode or an active power scheduling mode.

Figure 6A:
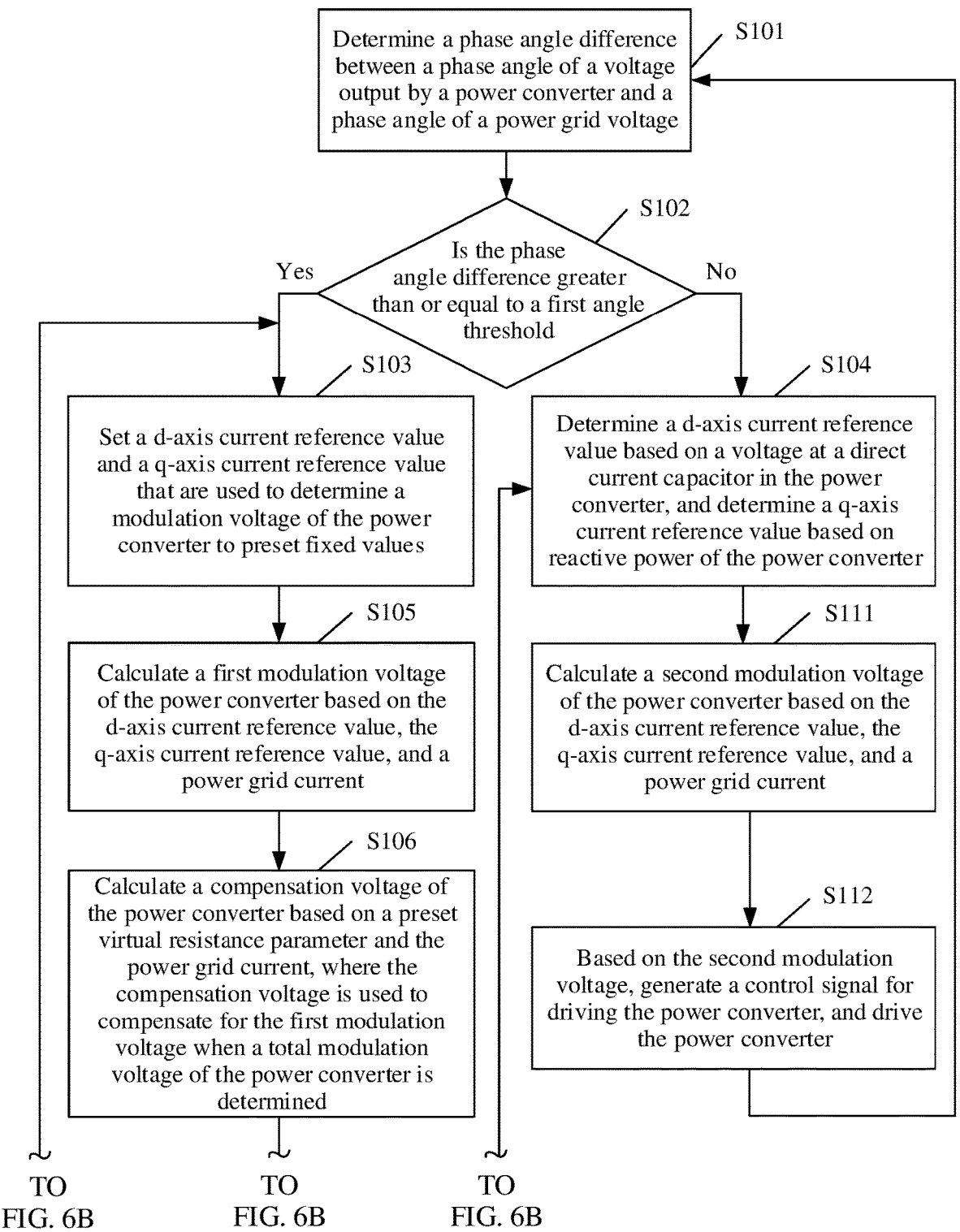
FIG. 6A and FIG. 6B are a schematic flowchart of a power converter control method.
Figure 6B:
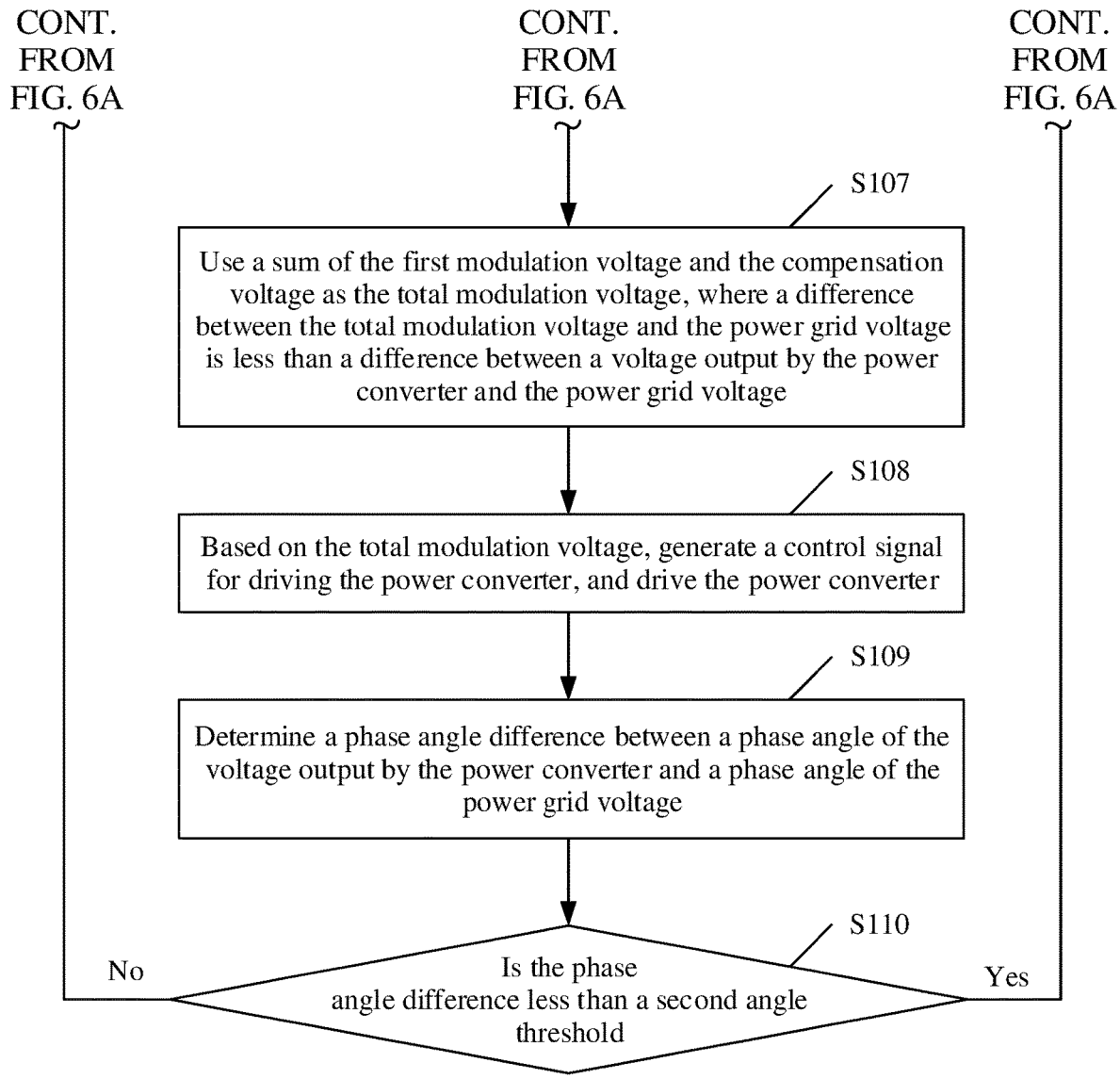

FIG. 6A and FIG. 6B show a change in power at the direct current capacitor in the power converter when the power converter is separately driven by the control apparatus provided in this application and an existing control apparatus through a simulation experiment when a phase angle jump of 180° occurs in the power grid voltage. A thick line shows the change in the power at the direct current capacitor in the power converter when the power converter is driven by the existing control apparatus. A thin line shows the change in the power at the direct current capacitor in the power converter when the power converter is driven by the control apparatus provided in this application. It can be learned from comparison that, when a large phase occurs in the power grid voltage, by driving the power converter, the control apparatus provided in this application can greatly reduce a power backfeed phenomenon, reduce a direct current bus capacitor stress of the power converter, shorten time for resynchronization with the phase of the power grid voltage by more than 50%, and greatly improve transient performance of the power converter.

All or some of the foregoing embodiments may be implemented by software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, some or all of the procedures or functions according to embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired manner (for example, a coaxial cable, an optical fiber, or a digital subscriber line (DSL)) or a wireless manner (for example, infrared, radio, and microwave). The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), or a semiconductor medium (for example, a solid state disk (SSD)), or the like.

An embodiment of this application further provides a readable storage medium, configured to store the method or algorithm provided in the foregoing embodiments, for example, a random access memory (RAM), a flash memory, a read only memory (ROM), an EPROM memory, a non-volatile read only memory, a register, a hard disk, a removable disk, or a storage medium in any other form in the art.

Steps of the methods or algorithms described in embodiments of this application may be directly embedded into the control apparatus. The control apparatus may include a RAM, a flash memory, a ROM, an EPROM, a register, a hard disk, a removable magnetic disk, or a storage medium in any other form in the art, and is configured to store steps the method or algorithm provided in embodiments of this application. For example, the storage medium may be connected to the processing module or the processor (or the controller) in the control apparatus, so that the processing module and the processor (or the controller) may read information from the storage medium and write information into the storage medium. Optionally, the storage medium may be further integrated into the processing module and the processor (or the controller).

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although this application is described with reference to specific features and embodiments thereof, it is clear that various modifications and combinations may be made to them without departing from the scope of this application. Correspondingly, this specification and accompanying drawings are only examples of descriptions of this application defined by the appended claims, and are considered as any of or all modifications, variations, combinations, or equivalents that cover the scope of this application.

Obviously, a person skilled in the art can make various modifications and variations to this application without departing from the scope of this application. This application is intended to cover these modifications and variations of this application provided that they fall within the scope of protection defined by the following claims and their equivalent technologies.

What is claimed is:
1. A power converter control method, comprising:
  determining a phase angle difference between a phase angle of a voltage output by a power converter and a phase angle of a power grid voltage, wherein the power converter is connected to a filter circuit, the filter circuit is connected to a power grid, wherein the power grid voltage is a voltage between the filter circuit and the power grid, and the voltage output by the power converter is a voltage between the filter circuit and the power converter; and when the phase angle difference is greater than or equal to a first angle threshold, wherein the first angle threshold indicates a minimum value of the phase angle difference occurring when a phase jump occurs in the power grid, performing the following process:

setting a d-axis current reference value and a q-axis current reference value that are used to determine a modulation voltage of the power converter to preset fixed values;

calculating a first modulation voltage of the power converter based on the d-axis current reference value, the q-axis current reference value, and a power grid current, wherein the first modulation voltage is used to determine a total modulation voltage of the power converter, the total modulation voltage is used to generate a control signal of the power converter, and the control signal is used to drive the power converter to output the total modulation voltage;

calculating a compensation voltage of the power converter based on a preset virtual resistance parameter and the power grid current, wherein the compensation voltage is used to compensate the first modulation voltage when the total modulation voltage of the power converter is determined, and the power grid current is a current between the filter circuit and the power grid; and using a sum of the first modulation voltage and the compensation voltage as the total modulation voltage, wherein a difference between the total modulation voltage and the power grid voltage is less than a difference between the voltage output by the power converter and the power grid voltage.

2. The method according to claim 1, wherein the calculating a first modulation voltage of the power converter based on the d-axis current reference value, the q-axis current reference value, and a power grid current comprises:

calculating a d-axis component and a q-axis component of the power grid current in a two-phase coordinate system based on the power grid current and a conversion relationship between a three-phase coordinate system and the two-phase coordinate system, wherein an included angle between a positive direction of a d-axis in the two-phase coordinate system and a positive direction of an A-axis in the three-phase coordinate system is the phase angle of the power grid voltage; and calculating the first modulation voltage of the power converter in the two-phase coordinate system based on the d-axis current reference value, the q-axis current reference value, and the d-axis component and the q-axis component of the power grid current in the two-phase coordinate system.

3. The method according to claim 2, wherein the calculating a compensation voltage of the power converter based on a preset virtual resistance parameter and the power grid current comprises:

determining the compensation voltage based on a first voltage and a second voltage, wherein the first voltage is a product of the d-axis component of the power grid current in the two-phase coordinate system and the virtual resistance parameter, and the second voltage is a product of the q-axis component of the power grid current in the two-phase coordinate system and the virtual resistance parameter.

4. The method according to claim 3, wherein before the determining the compensation voltage, the method further comprises:

separately filtering the d-axis component and the q-axis component of the power grid current in the two-phase coordinate system, to eliminate noise signals of the power grid current in the d-axis component and the q-axis component in the two-phase coordinate system.

5. The method according to claim 2, wherein before the determining a phase angle difference between a phase angle of a voltage output by the power converter and a phase angle of a power grid voltage, the method further comprises:

calculating a q-axis component of the power grid voltage in the two-phase coordinate system based on the power grid voltage and the conversion relationship between the three-phase coordinate system and the two-phase coordinate system;

inputting the q-axis component of the power grid voltage in the two-phase coordinate system into a proportional integral regulator, to generate a rotation frequency parameter; and inputting the rotation frequency parameter into an integrator, to generate the phase angle of the power grid voltage.

6. The method according to claim 5, wherein the determining a phase angle difference between a phase angle of a voltage output by the power converter and a phase angle of a power grid voltage comprises:

calculating a d-axis component and the q-axis component of the power grid voltage in the two-phase coordinate system based on the power grid voltage and the conversion relationship between the three-phase coordinate system and the two-phase coordinate system; and determining the phase angle difference according to a preset function, and the d-axis component and the q-axis component of the power grid voltage in the two-phase coordinate system.

7. The method according to claim 5, wherein before the calculating a d-axis component and a q-axis component of the power grid current in a two-phase coordinate system, the method further comprises:

adjusting a parameter of the proportional integral regulator or a parameter of the integrator, to increase a speed of a generated phase angle of the power grid voltage to be equal to a speed of the phase angle of the power grid voltage.

8. The method according to claim 1, wherein after the using a sum of the first modulation voltage and the compensation voltage as the total modulation voltage, the method further comprises:

when a phase angle difference between a most recently determined phase angle of the voltage output by the power converter and a phase angle of a voltage on a cable is less than a second angle threshold, wherein the second angle threshold is less than the first angle threshold, performing the following process:

determining the d-axis current reference value based on a voltage at a direct current capacitor in the power converter, and determining the q-axis current reference value based on reactive power of the power converter; and calculating a second modulation voltage of the power converter based on the d-axis current reference value, the q-axis current reference value, and the power grid current, wherein a control signal of the power converter generated based on the second modulation voltage is used to drive the power converter to output an active current that is the d-axis current reference value and to output a reactive current that is the q-axis current reference value.

9. A control apparatus, configured to control a power converter,
wherein the power converter is connected to a filter circuit, the filter circuit is connected to a power grid, and the control apparatus comprises a voltage and current collection module and at least one processor, wherein
the voltage and current collection module is configured to collect a power grid current and a power grid voltage, wherein the power grid voltage is a voltage between the filter circuit and the power grid, and the power grid current is a current between the filter circuit and the power grid; and
the at least one processor is configured to:
determine a phase angle difference between a phase angle of a voltage output by the power converter and a phase angle of the power grid voltage;
when the phase angle difference is greater than or equal to a first angle threshold, wherein the first angle threshold indicates a minimum value of the phase angle difference occurring when a phase jump occurs in the power grid, perform the following process:
setting a d-axis current reference value and a q-axis current reference value that are used to determine a modulation voltage of the power converter to preset fixed values;
calculating a first modulation voltage of the power converter based on the d-axis current reference value, the q-axis current reference value, and the power grid current, wherein the first modulation voltage is used to determine a total modulation voltage of the power converter, the total modulation voltage is used to generate a control signal of the power converter, and the control signal is used to drive the power converter to output the total modulation voltage;
calculating a compensation voltage of the power converter based on a preset virtual resistance parameter and the power grid current, wherein the compensation voltage is used to compensate the first modulation voltage when the total modulation voltage of the power converter is determined; and
using a sum of the first modulation voltage and the compensation voltage as the total modulation voltage, wherein a difference between the total modulation voltage and the power grid voltage is less than a difference between the voltage output by the power converter and the power grid voltage.

10. The control apparatus according to claim 9, wherein when the at least one processor calculates the first modulation voltage of the power converter based on the d-axis current reference value, the q-axis current reference value, and the power grid current, the at least one processor is configured to:
calculate a d-axis component and a q-axis component of the power grid current in a two-phase coordinate system based on the power grid current and a conversion relationship between a three-phase coordinate system and the two-phase coordinate system, wherein an included angle between a positive direction of a d-axis in the two-phase coordinate system and a positive direction of an A-axis in the three-phase coordinate system is the phase angle of the power grid voltage; and
calculate the first modulation voltage of the power converter in the two-phase coordinate system based on the d-axis current reference value, the q-axis current reference value, and the d-axis component and the q-axis component of the power grid current in the two-phase coordinate system.

11. The control apparatus according to claim 10, wherein when the at least one processor calculates the compensation voltage of the power converter based on the preset virtual resistance parameter and the power grid current, the at least one processor is configured to:
determine the compensation voltage based on a first voltage and a second voltage, wherein the first voltage is a product of the d-axis component of the power grid current in the two-phase coordinate system and the virtual resistance parameter, and the second voltage is a product of the q-axis component of the power grid current in the two-phase coordinate system and the virtual resistance parameter.

12. The control apparatus according to claim 11, wherein the at least one processor is further configured to:
before determining the compensation voltage, separately filter the d-axis component and the q-axis component of the power grid current in the two-phase coordinate system, to eliminate noise signals of the power grid current in the d-axis component and the q-axis component in the two-phase coordinate system.

13. The control apparatus according to claim 10, wherein the control apparatus further comprises a phase-locked loop module, and the phase-locked loop module comprises a converter a proportional integral regulator, and an integrator, wherein
the converter is configured to: calculate a q-axis component of the power grid voltage in the two-phase coordinate system based on the power grid voltage and the conversion relationship between the three-phase coordinate system and the two-phase coordinate system, and input the q-axis component of the power grid voltage in the two-phase coordinate system into the proportional integral regulator;
the proportional integral regulator is configured to: receive the q-axis component of the power grid voltage in the two-phase coordinate system, generate a rotation frequency parameter, and input the rotation frequency parameter into the integrator; and
the integrator is configured to: receive the rotation frequency parameter, generate the phase angle of the power grid voltage, and provide the phase angle to the at least one processor.

14. The control apparatus according to claim 13, wherein when the at least one processor determines the phase angle difference between the phase angle of the voltage output by the power converter and the phase angle of the power grid voltage, the at least one processor is configured to:
calculate a d-axis component and the q-axis component of the power grid voltage in the two-phase coordinate system based on the power grid voltage and the conversion relationship between the three-phase coordinate system and the two-phase coordinate system; and
determine the phase angle difference according to a preset function, and the d-axis component and the q-axis component of the power grid voltage in the two-phase coordinate system.

15. The control apparatus according to claim 13, wherein the at least one processor is further configured to:
before calculating the d-axis component and the q-axis component of the power grid current in the two-phase coordinate system, adjust a parameter of the proportional integral regulator or a parameter of the integrator, to increase a speed of a generated phase angle of the power grid voltage to be equal to a speed of the phase angle of the power grid voltage.

16. The control apparatus according to claim 9, wherein the at least one processor is further configured to:
- after using a sum of the first modulation voltage and the compensation voltage as the total modulation voltage, if a phase angle difference between a most recently determined phase angle of the voltage output by the power converter and a phase angle of a voltage on a cable is less than a second angle threshold, wherein the second angle threshold is less than the first angle threshold, perform the following process: determining the d-axis current reference value based on a voltage at a direct current capacitor in the power converter, and determining the q-axis current reference value based on reactive power of the power converter; and
- calculate a second modulation voltage of the power converter based on the d-axis current reference value, the q-axis current reference value, and the power grid current, wherein a control signal of the power converter generated based on the second modulation voltage is used to drive the power converter to output an active current that is the d-axis current reference value and to output a reactive current that is the q-axis current reference value.

17. A power conversion system, comprising a control apparatus and a power converter according,
- wherein the power converter is connected to a filter circuit, the filter circuit is connected to a power grid, and
- the control apparatus comprises a voltage and current collection module and at least one processor, wherein
- the voltage and current collection module is configured to collect a power grid current and a power grid voltage, wherein the power grid voltage is a voltage between the filter circuit and the power grid, and the power grid current is a current between the filter circuit and the power grid; and
- the at least one processor is configured to:
- determine a phase angle difference between a phase angle of a voltage output by the power converter and a phase angle of the power grid voltage;
- when the phase angle difference is greater than or equal to a first angle threshold, wherein the first angle threshold indicates a minimum value of the phase angle difference occurring when a phase jump occurs in the power grid, perform the following process:
- setting a d-axis current reference value and a q-axis current reference value that are used to determine a modulation voltage of the power converter to preset fixed values;
- calculating a first modulation voltage of the power converter based on the d-axis current reference value, the q-axis current reference value, and the power grid current, wherein the first modulation voltage is used to determine a total modulation voltage of the power converter, the total modulation voltage is used to generate a control signal of the power converter, and the control signal is used to drive the power converter to output the total modulation voltage;
- calculating a compensation voltage of the power converter based on a preset virtual resistance parameter and the power grid current, wherein the compensation voltage is used to compensate the first modulation voltage when the total modulation voltage of the power converter is determined; and
- using a sum of the first modulation voltage and the compensation voltage as the total modulation voltage, wherein a difference between the total modulation voltage and the power grid voltage is less than a difference between the voltage output by the power converter and the power grid voltage; and wherein
- the control apparatus is configured to control the power converter to output electric energy to the power grid.

18. The power conversion system according to claim 17, wherein when the at least one processor is configured to:
- calculate a d-axis component id and a q-axis component of the power grid current in a two-phase coordinate system based on the power grid current and a conversion relationship between a three-phase coordinate system and the two-phase coordinate system, wherein an included angle between a positive direction of a d-axis in the two-phase coordinate system and a positive direction of an A-axis in the three-phase coordinate system is the phase angle of the power grid voltage; and
- calculate the first modulation voltage of the power converter in the two-phase coordinate system based on the d-axis current reference value, the q-axis current reference value, and the d-axis component and the q-axis component of the power grid current in the two-phase coordinate system.

19. The power conversion system according to claim 18, wherein the at least one processor is configured to:
- determine the compensation voltage based on a first voltage and a second voltage, wherein the first voltage is a product of the d-axis component of the power grid current in the two-phase coordinate system and the virtual resistance parameter, and the second voltage is a product of the q-axis component of the power grid current in the two-phase coordinate system and the virtual resistance parameter.

* * * * *